US 6,681,227 B1

(12) United States Patent
Kojima et al.

(10) Patent No.: US 6,681,227 B1
(45) Date of Patent: Jan. 20, 2004

(54) DATABASE SYSTEM AND A METHOD OF DATA RETRIEVAL FROM THE SYSTEM

(75) Inventors: Kazuhito Kojima, Tokyo (JP); Mitsuru Yoshikura, Tokyo (JP); Hiromoto Uesugi, Oita (JP)

(73) Assignee: NS Solutions Corporation, Tokyo (JP)

( * ) Notice: Subject to any disclaimer, the term of this patent is extended or adjusted under 35 U.S.C. 154(b) by 0 days.

(21) Appl. No.: 09/195,099

(22) Filed: Nov. 18, 1998

(30) Foreign Application Priority Data

Nov. 19, 1997 (JP) .............................. 9-334905
Nov. 19, 1997 (JP) .............................. 9-334906

(51) Int. Cl.[7] ............................................ G09F 17/30
(52) U.S. Cl. .................... 707/10; 707/1; 707/3; 707/6; 707/102; 707/104; 709/203; 709/217
(58) Field of Search .................... 707/1, 3, 6, 10, 707/104, 102; 709/203, 2, 7; 395/200.47

(56) References Cited

U.S. PATENT DOCUMENTS

| | | | | |
|---|---|---|---|---|
| 5,649,103 A | * | 7/1997 | Datta et al. ................. | 709/203 |
| 5,835,904 A | * | 11/1998 | Vicik et al. .................... | 707/1 |
| 5,884,321 A | * | 3/1999 | Meffert ........................ | 707/104 |
| 5,918,013 A | * | 6/1999 | Mighdoll et al. ....... | 395/200.47 |
| 6,023,696 A | * | 2/2000 | Osborn et al. ................. | 707/3 |
| 6,151,602 A | * | 11/2000 | Hejlsberg et al. ............. | 707/10 |
| 6,282,548 B1 | * | 8/2001 | Burner et al. ............... | 707/104 |

* cited by examiner

Primary Examiner—Thuy N. Pardo
(74) Attorney, Agent, or Firm—Connolly Bove Lodge & Hutz LLP; Larry J. Hume

(57) ABSTRACT

Since metadata pertaining to real data stored in at least one database (DB) are collected and managed at a single meta DB server, and metadata that match a retrieval request are extracted by search of the meta DB server, even when a plurality of DBs and DB servers for managing DBs are present on a network, all metadata that match the retrieval request can be extracted independently of which DBs metadata pertain to. Hence, all data that match a retrieval request can be obtained from a single server independently of the actual locations of the distributed DBs and DB servers.

19 Claims, 13 Drawing Sheets

F I G. 8

```
LAYER DATABASE
FORMAT DBKEY,DBEXPL,DBMS,DBLIMIT,SERIAL,CHECK,RETRY,EMAIL,TBLFILE,DBNAME,SQLURL
DATA DEMO ; MEMBER,¥
        MEMBER INFORMATION,¥
        OracleWorkgroupServer-7.3,¥
        allow @foo.co.jp;deny all,¥
        19971225000000,¥
        3600,¥
        600,¥
        dbnavi@foo.co.jp,¥
        tables.html,¥
        demo@navi.foo.co.jp,¥
        http://navi.foo.co.jp:8080/servlet/DBNAVI/service
```

FIG. 10

SEVEN COLUMNS PERTAIN TO x1, x4, x8, AND x9
→links 1 to 7
SELECT FOUR OUT OF SEVEN COLUMNS

VIEW X

| x1 | x2 | x3 | x4 | x5 | x6 | x7 | x8 | x9 |
|----|----|----|----|----|----|----|----|----|
| 1  | 2  | 3  | 4  | 5  | 6  | 7  | 8  | 9  |

| a1 (KEY) | a2 | a3 | a4 |
|----------|----|----|----|
| 1        | 2  | 3  | 4  |

TABLE A (REAL TABLE)

| b1 (KEY) | b2 | b3 | b4 | b5 |
|----------|----|----|----|----|
| 1        | 5  | 6  | 7  | 8  |

TABLE B (REAL TABLE)

| c1 (KEY) | c2 | c3 |
|----------|----|----|
| 1        | 8  | 9  |

TABLE C (REAL TABLE)

FIG. 11

| b1 (KEY) | b2 | b3 | b4 | b5 |
|---|---|---|---|---|
| 1 | 5 | 6 | 7 | 8 |

TABLE B

| a1 (KEY) | a2 | a3 | a4 |
|---|---|---|---|
| 1 | 2 | 3 | 4 |

TABLE A

| c1 (KEY) | c2 | c3 |
|---|---|---|
| 1 | 8 | 9 |

TABLE C

VIEW X

| x1 | x2 | x3 | x4 | x5 | x6 | x7 | x8 | x9 |
|---|---|---|---|---|---|---|---|---|
| 1 | 2 | 3 | 4 | 5 | 6 | 7 | 8 | 9 |

SELECT links 4,6,AND 7
DELETE links 1,3,AND 5
CARRY OVER link 2

FIG. 12

SELECT link 2
NUMBER OF UNSOLVED LINKS=0
END OF SOLUTION

VIEW X

| x1 | x2 | x3 | x4 | x5 | x6 | x7 | x8 | x9 |
|----|----|----|----|----|----|----|----|----|
| 1  | 2  | 3  | 4  | 5  | 6  | 7  | 8  | 9  |

| a1 (KEY) | a2 | a3 | a4 |
|----------|----|----|----|
| 1        | 2  | 3  | 4  |

TABLE A

| b1 (KEY) | b2 | b3 | b4 | b5 |
|----------|----|----|----|----|
| 1        | 5  | 6  | 7  | 8  |

TABLE B

| c1 (KEY) | c2 | c3 |
|----------|----|----|
| 1        | 8  | 9  |

TABLE C

DATABASE SYSTEM AND A METHOD OF DATA RETRIEVAL FROM THE SYSTEM

BACKGROUND OF THE INVENTION

1. Field of the Invention

The present invention relates to a database system, data retrieval method, and storage medium and, more particularly, to a technique suitably used in a retrieval system that finds out desired data from a plurality of distributed databases.

2. Description of the Related Art

As the performance of computers becomes higher in recent years, a large-scale computer such as a single main frame or the like has been replaced by a distributed system built by a plurality of workstations or personal computers in recent years. The distributed system makes development and maintenance of the system relatively easy. As an example of the distributed system, the so-called Internet is known.

In the Internet, a plurality of computers are distributed worldwide as servers or clients, and construct a single, huge database (to be abbreviated as a DB hereinafter). Text information, image information, and the like are registered in these DBs or are read out therefrom using some protocols. Not only in such Internet, but also in a system that deals with a huge volume of data, DBs tend to be distributed.

When desired information is read out from such distributed DBs, it requires very much time and labor to search all servers that manage these DBs for required information. More specifically, since the user does not know the location of information to be read out in the distributed DBs, he or she must access servers allocated in correspondence with these DBs in turn and must repeat search until he or she finds desired information.

It is impossible to retrieve required information from all the servers unless the user knows the locations (address information such as URL: Uniform Resource Locator) of all DB servers. However, the distributed DB servers constantly register or delete data, and each DB server itself is constantly connected to or disconnected from the network. Hence, it is very hard for the user to recognize all these facts and to retrieve accurate information.

In order to eliminate such inconvenience, address retrieval services called search engines are available in, e.g., the Internet. Each search engine collects URL information automatically or manually, and a required URL can be retrieved by inputting, e.g., a keyword. For example, if a search using a keyword "patent" is made, the URLs of servers relevant to "patent" are output.

However, the search engine can only retrieve the URL information of a DB server, but cannot search an RDBMS (relational DB management system) built in the server at that retrieved URL. Therefore, in order to search an RDBMS or the like, the user retrieves information of a desired server from the search engine, and then connects to the desired server on the basis of the retrieval result. Then, the user searches the DB for his or her required information using a DB retrieval method corresponding to that server.

In this way, conventionally, upon acquiring desired data, when DBs that store various kinds of data are distributed, data retrieval requires much time and labor.

Furthermore, in the RDBMS, the maximum number of columns that can be held in one table is normally limited. Hence, in an RDBMS, the maximum number of columns of which is limited to 256, when a table having 257 or more columns is created, a plurality of tables (real tables) each including 256 columns or less are generated, and are related to apparently build a database as a single table (view).

For example, single view X shown in FIG. 1 is made up of three real tables A, B, and C, which are related. More specifically, identical data is stored in key columns a1, b1, and c1 on real tables A, B, and C, and column x1 of view X is formed using these columns a1, b1, and c1 as joint keys, thus maintaining consistency among the three independent tables. That is, column x1 on view X is common to three columns a1, b1, and c1.

Also, columns a2, a3, and a4 on real table A correspond to columns x2, x3, and x4 on view X, column b2, b3, b4, and b5 on real table B to columns x5, x6, x7, and x8 on view X, and columns c2 and c3 on real table C to columns x8 and x9 on view X, respectively. Paying attention to column x8 on view X, two columns, i.e., column b5 on real table B and column c2 on real table C are related to this column. In other words, these columns b5 and c2 on real tables B and C store identical data.

A protocol for creating single view X from three real tables A, B, and C is as follows:

create view viewX (x1, x2, x3, x4, x5, x6, x7, x8, x9)

as select a1, a2, a3, a4, b2, b3, b4, b5, c3 from TableA, TableB, TableC where a1=b1 and a1=c1 and b5=c2

However, when such DB having a plurality of real tables A, B, and C is searched for given data, the following problem is posed. That is, in a conventional DB system, since a search is made by calling all the related real tables, all real tables A, B, and C are to be searched irrespective of real table in which desired data is located, and the individual real tables are searched in turn in accordance with a search formula input by the user.

Assuming that data to be retrieved pertains to columns x8 and x9 on view X, since column x8 on view X has data common to columns b5 and c2 on real tables B and C, actual search can be completed using only real table C that corresponds to both columns x8 and x9 without using real table B. Since columns x8 and x9 on view X correspond to none of the columns on real table A, there is no need for searching real time A in practice.

More specifically, in the conventional DB system, a broad range is searched by joining real tables more than required. Such processing prolongs the DB search time, and requires a more memory area of the computer that forms the system than required, resulting in low search performance.

When the user searches the DB, all the real tables must be joined. However, since the number of columns is also limited on a view provided by an RDBMS as in a real table, a long view cannot be formed beyond the physical limitation. Therefore, upon observing the contents of a view beyond the physical limitation, the contents must be presented to the user in units of real tables or by preparing a customized application program which manages data in units of real tables.

SUMMARY OF THE INVENTION

It is an object of the present invention to provide a mechanism that allows the user to easily search a DB system built by distributed DBs and their servers without requiring immediate connectivity to the distributed DB servers.

It is another object of the present invention to provide a mechanism which always recognizes information pertaining to each DB stored in distributed servers, and allows the user to retrieve the latest information at the time of search as a result without exerting any extra load on the user.

It is still another object of the present invention to provide a database system which can join tables at high speed with a minimum required memory capacity in a relational database system.

It is still another object of the present invention to create a long view beyond the physical limitation on a database.

In order to achieve the above objects, a database system built by distributing one or more databases and one or more first servers which search the databases for real data on a network, comprises metadata management means for collecting metadata which pertain to real data stored in the one or more databases from the one or more first servers, and managing the collected metadata, and metadata retrieval means for extracting metadata which matches a request from a user terminal connected to the network by search in response to the request.

Note that the metadata management means and metadata retrieval means may be located in one or more second servers different from the first servers.

According to another feature of the present invention, the metadata contains at least information indicating a location of the database or the first server, and contents of real data in the database.

According to still another feature of the present invention, the user terminal comprises means for inputting a retrieval request of the metadata, means for inputting a retrieval condition upon retrieving real data on the database using a retrieval result of the metadata supplied from the metadata retrieval means, and means for transferring the input retrieval condition to the first server indicated by the extracted metadata as a retrieval request.

According to still another feature of the present invention, the system further comprises means for providing a form for inputting the retrieval condition, which form can be commonly used irrespective of the retrieval result of the metadata retrieval means.

According to still another feature of the present invention, the first server comprises means for converting the retrieval request to the database transferred from the user terminal into a format concordant with the database to be accessed.

According to still another feature of the present invention, the first server comprises metadata saving means for creating and saving metadata that pertains to the database managed by that first server, and the second server comprises means for acquiring corresponding metadata when data stored in the metadata saving means has been updated.

Note that the second server may comprise means for acquiring data stored in the metadata saving means at a predetermined time interval.

A data retrieval method according to the present invention comprises the steps of: collecting metadata that pertain to real data stored in databases distributed on a network by a second server via first servers distributed on the network, and saving the collected metadata; extracting metadata that matches a request by search of the collected metadata; inputting a retrieval condition for the database on the basis of a retrieval result of the metadata; issuing a retrieval request of the real data to the first server indicated by the extracted metadata; and retrieving, by the first server, the real data from the corresponding database in accordance with the retrieval request.

A recording medium according to the present invention records a program for making a computer implement, in a database system built by distributing on a network one or more user terminals, one or more databases, one or more first servers for searching the databases for real data, and one or more second servers for collecting metadata which pertain to real data stored in the one or more databases from the one or more first servers and managing the collected metadata: a function of collecting the metadata of the distributed databases by the second server via the first servers; a function of extracting metadata which matches a retrieval request from a user by search of the collected metadata in response to the retrieval request; a function of inputting a retrieval condition for the databases at the user terminal on the basis of a retrieval result of the metadata, and issuing a retrieval request of the real data to the first server indicated by the extracted metadata; and a function of retrieving the real data by the first server in accordance with the retrieval request.

Since the present invention is comprised of the aforementioned technical means, when a retrieval request is issued to the second server that collects and manages metadata pertaining to one or more databases, all metadata that match the request are retrieved and presented to the user. Even when a plurality of databases and first servers that manage these databases are present on a network, when a retrieval request is issued to the second server, all metadata that match the retrieval request are retrieved independently of which databases metadata pertain to. For this reason, the user can obtain all data that match his or her retrieval request from one server as long as he or she knows only the location of the second server, even if he or she does not know the locations of the distributed databases or the first servers. In this way, the second server comprises means for providing metadata to other computers, and also provides a gateway for search common to all the databases by integrating the schemata of databases on the network.

According to another feature of the present invention, since metadata contains the location of at least the database or first server, and information that represents the contents of real data in the database, the user can detect the location of the database which stores real data that matches the retrieval request, or the first server that manages the database simultaneously with retrieval of metadata. Consequently, the user need only know the location of the second server, and need not be aware of the locations of the distributed databases and first servers for managing these databases.

According to still another feature of the present invention, since the user terminal comprises means for inputting a retrieval condition upon searching for real data using the retrieval result of metadata, and means for transferring the input retrieval condition to the first server as a retrieval request, the user, who has detected the location of the database that stores desired real data on the basis of the retrieval result of the metadata, can search for real data by inputting the retrieval condition.

According to still another feature of the present invention, since the first server comprises means for converting the retrieval request for the database transferred from the user terminal into a format concordant with the database to be accessed, the user need only create and issue a retrieval condition that fulfills a standard format without taking notice of the sites of individual distributed databases, thus building a multidatabase system of a plurality of different kinds of distributed databases.

According to still another feature of the present invention, since the second server comprises the function of retrieving metadata when the first server has updated metadata or at given time intervals, metadata collected at the second server allow the user to always obtain the latest information at the time of search as a result, thus flexibly coping with changes in the system.

In another aspect of a database system according to the present invention, a database system, which searches a plurality of tables joined by a relational database, comprises table extraction means for extracting one table including columns that store data to be retrieved from a plurality of tables, and column exclusion means for excluding columns of the table extracted by the table extraction means and columns on other tables which store the same data contents as data contents of the columns on the extracted table from columns to be extracted in subsequent processing, and the tables extracted in turn by the table extraction means are joined when the processing of the table extraction means and the processing of the column exclusion means have been repeated until all the columns including data to be retrieved are analyzed.

According to another feature of the present invention, the table extraction means extracts one table including a largest number of columns which store data to be retrieved from the plurality of tables.

According to still another feature of the present invention, the system further comprises metadata management means for collecting and managing metadata which pertain to joining of the plurality of tables, and wherein the table extraction means extracts the table on the basis of the metadata stored in the metadata management means.

According to still another feature of the present invention, the system further comprises retrieval means for retrieving objects in accordance with a retrieval key, and data is retrieved from the tables which are extracted in turn and joined by the table extraction means.

In another aspect of a data retrieval method of the present invention, a method of data retrieval from a database, processing for extracting a table and processing for excluding columns including identical data upon search by joining a plurality of tables by a relational database are repeated in such a manner that one table including columns that store data to be retrieved is extracted from the plurality of tables, columns which store the same data contents as data contents of columns on the extracted table of other tables are excluded, and another table is extracted from the remaining tables, and one or more tables extracted in turn at that time are joined.

According to another feature of the present invention, upon extracting one table from the plurality of tables, one table including a largest number of columns that store data to be retrieved is extracted.

According to still another feature of the present invention, data is retrieved from the one or more joined tables.

Another aspect of a recording medium of the present invention records a program for making a computer implement: means for extracting one table including columns that store data to be retrieved from a plurality of tables upon search by joining a plurality of tables by a relational database; means for excluding columns of the extracted table and columns on other tables which store the same data contents as data contents of the columns on the extracted table from columns to be extracted in subsequent processing; and means for joining the tables extracted in turn when the processing of the two means have been repeated until all the columns including data to be retrieved are analyzed.

According to another feature of the present invention, the program makes the computer further implement retrieval means for retrieving objects in accordance with a retrieval key from the tables extracted and joined by the table extraction means.

Since the present invention is comprised of the aforementioned technical means, when columns with identical data contents are present in different tables, the columns with the identical data contents are handled as the one that belongs to one of the tables (e.g., a table having the largest number of columns to be retrieved) during the process, and all tables that contain identical columns are not always joined. Also, a table that includes no columns to be retrieved is not extracted as tables to be joined. In this manner, an unnecessarily large number of tables can be prevented from being joined.

According to another feature of the present invention, since a plurality of tables are not independently managed but are systematically managed by collecting metadata pertaining to table joining, the user can see the plurality of tables as one table although they are merely joined ones when viewed from the database system. That is, a long view beyond the physical limitations, e.g., the number of columns, of a database can be formed.

BRIEF DESCRIPTION OF THE DRAWINGS

FIG. 8 shows an example of description of a metadata file pertaining to a DB;

FIG. 10 is a view for explaining the retrieval operation of the database system according to the second embodiment (a data retrieval method according to this embodiment);

FIG. 11 is a view for explaining the retrieval operation of the database system according to the second embodiment (a data retrieval method according to this embodiment);

FIG. 12 is a view for explaining the retrieval operation of the database system according to the second embodiment (a data retrieval method according to this embodiment)

DETAILED DESCRIPTION OF THE PREFERRED EMBODIMENTS

First Embodiment

Figure 1:
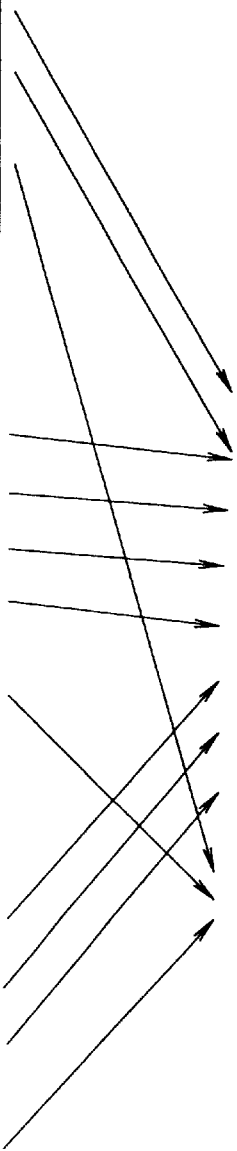
FIG. 1 is a view for explaining the relationship among real tables.
Figure 2:
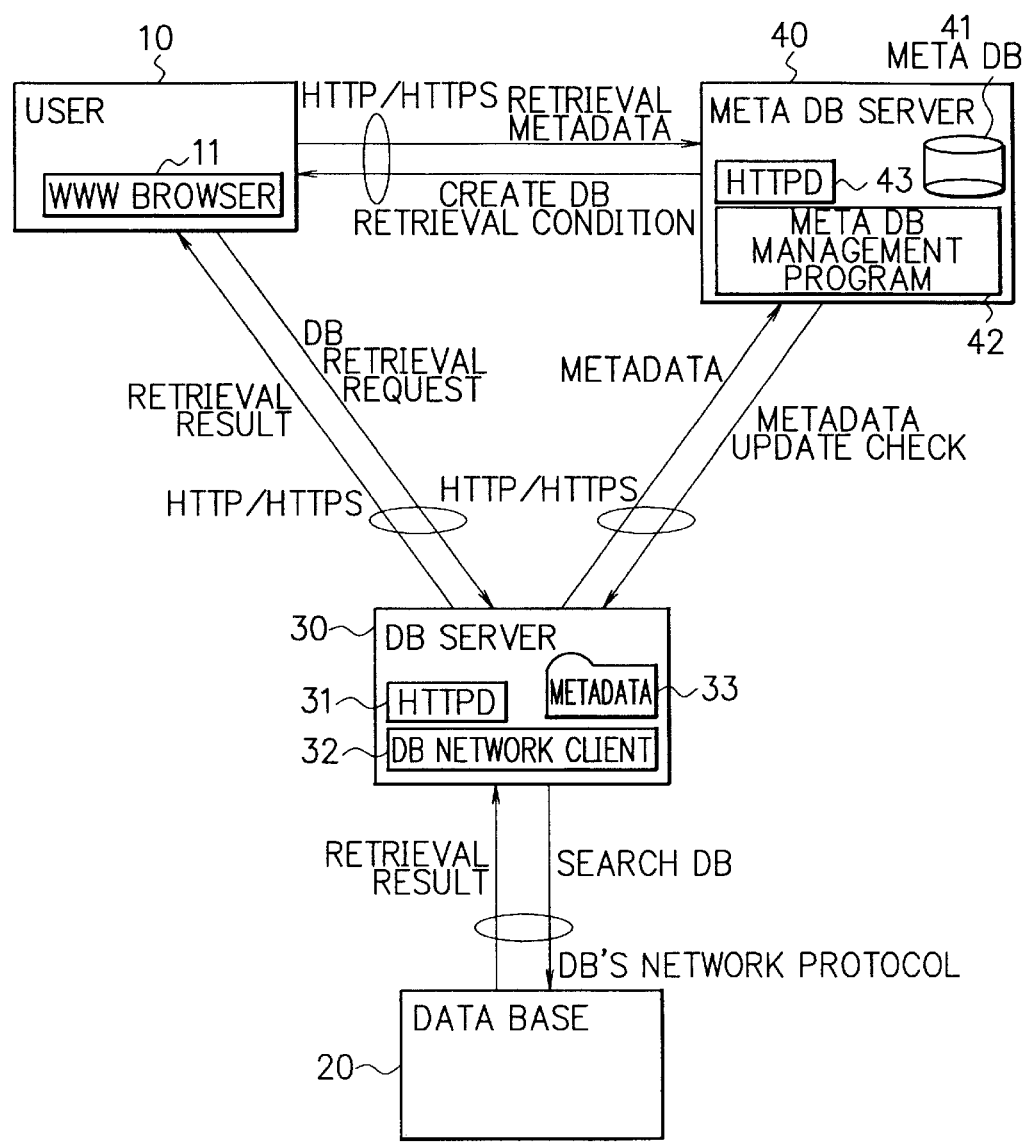
FIG. 2 is a schematic block diagram showing the arrangement of a database system according to the first embodiment of the present invention.
Figure 3:
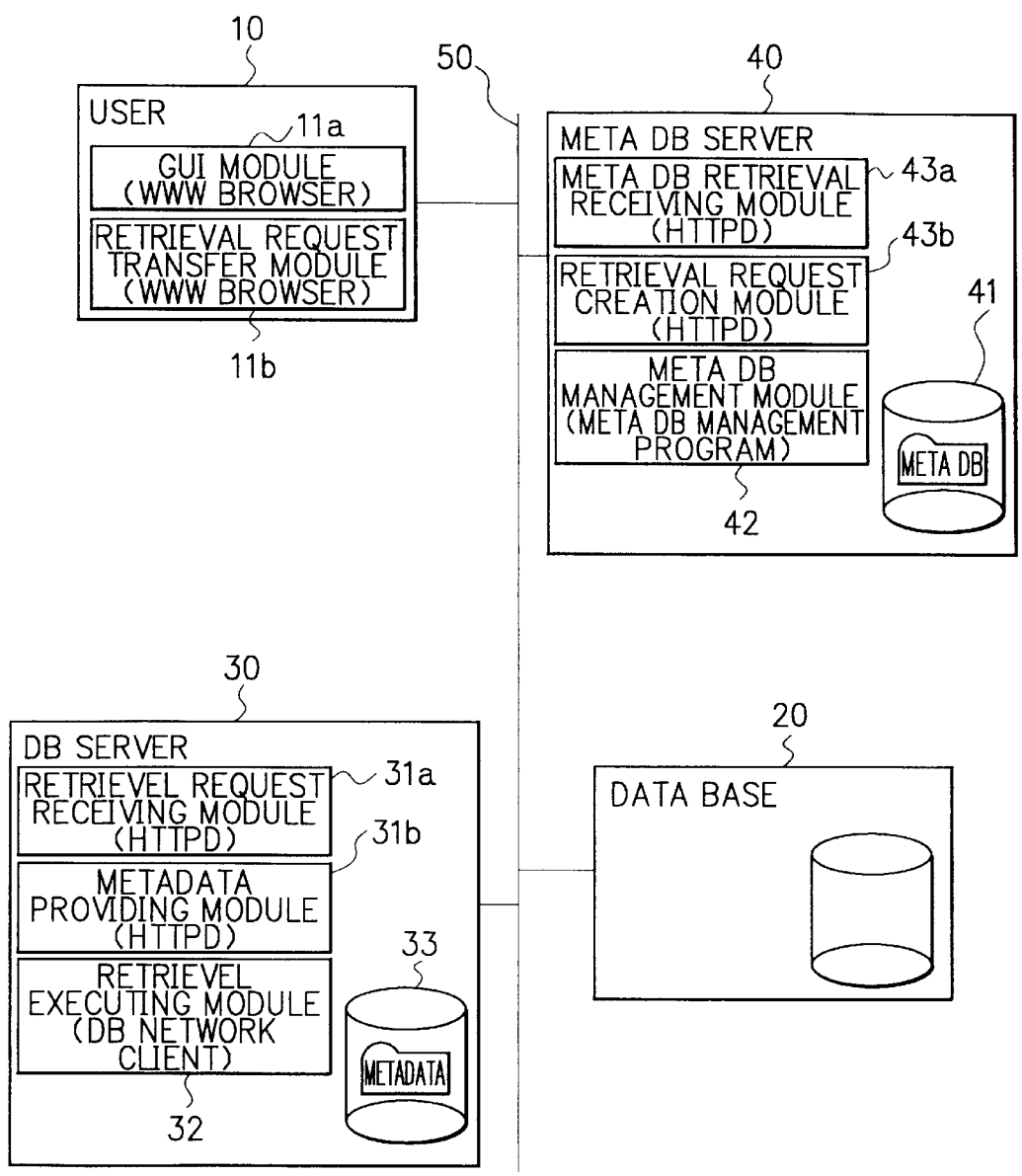
FIG. 3 is a block diagram showing software and hardware images of the database system according to the first embodiment.

FIG. 2 is a schematic block diagram showing the arrangement of a database system according to the first embodiment, and FIG. 3 is a block diagram showing software and hardware images of the database search system.

Referring to FIG. 2, reference numeral 10 denotes a user terminal which is installed with a WWW (World Wide Web) browser 11, and which inputs a keyword for search, issues a retrieval request, displays a retrieval result, and so forth on the WWW browser 11. A search for a meta DB (to be described later) or for real data is designated on this WWW browser 11. The WWW browser 11 comprises a GUI module 11a and retrieval request transfer module 11b, as shown in FIG. 3, allows the user to make various operations for search using the GUI module 11a, and transfers a retrieval request signal using the retrieval request transfer module 11b.

Reference numeral 20 denotes a database (DB) which stores actual data. At least one DB 20 is present on the network. A platform or DB application used for searching the DB 20 is not particularly limited. For example, data retrieval can be done by search means such as SQL (Structured Query Language: a database language for a relational DB having a table style data structure).

Reference numeral 30 denotes a DB server which is installed with an HTTPD (Hyper Text Transfer Protocol) 31 comprising a retrieval request receiving module 31a and metadata providing module 31b, and a retrieval executing module 32 made up of a DB network client, as shown in FIG. 3. Basically, one DB server 30 is provided to one DB 20, but one DB server 30 may manage a plurality of DBs 20.

The DB server 30 searches the DB 20 in response to a retrieval request from the user terminal 10, and sends back the retrieval result to the user terminal 10 in the HTML (Hyper Text Markup Language) format. In this case, the DB server 30 translates the retrieval request from the user terminal 10 into a format concordant with the DB 20 to absorb any discrepancies among different kinds of DBs. The DB server 30 also creates and stores metadata 33 pertaining to real data stored in the DB 20 managed by itself.

Note that metadata is information for managing data such as the attributes, semantic contents, acquisition sources, storage locations, and the like of data stored in the DB 20. In this embodiment, especially, the metadata contains at least data contents indicating what kinds of data the DB 20 store, and a URL used for accessing that DB 20. The DB server 30 provides the metadata 33 to a meta DB server 40 (to be described later) in response to a request from the meta DB server 40.

Figure 7:
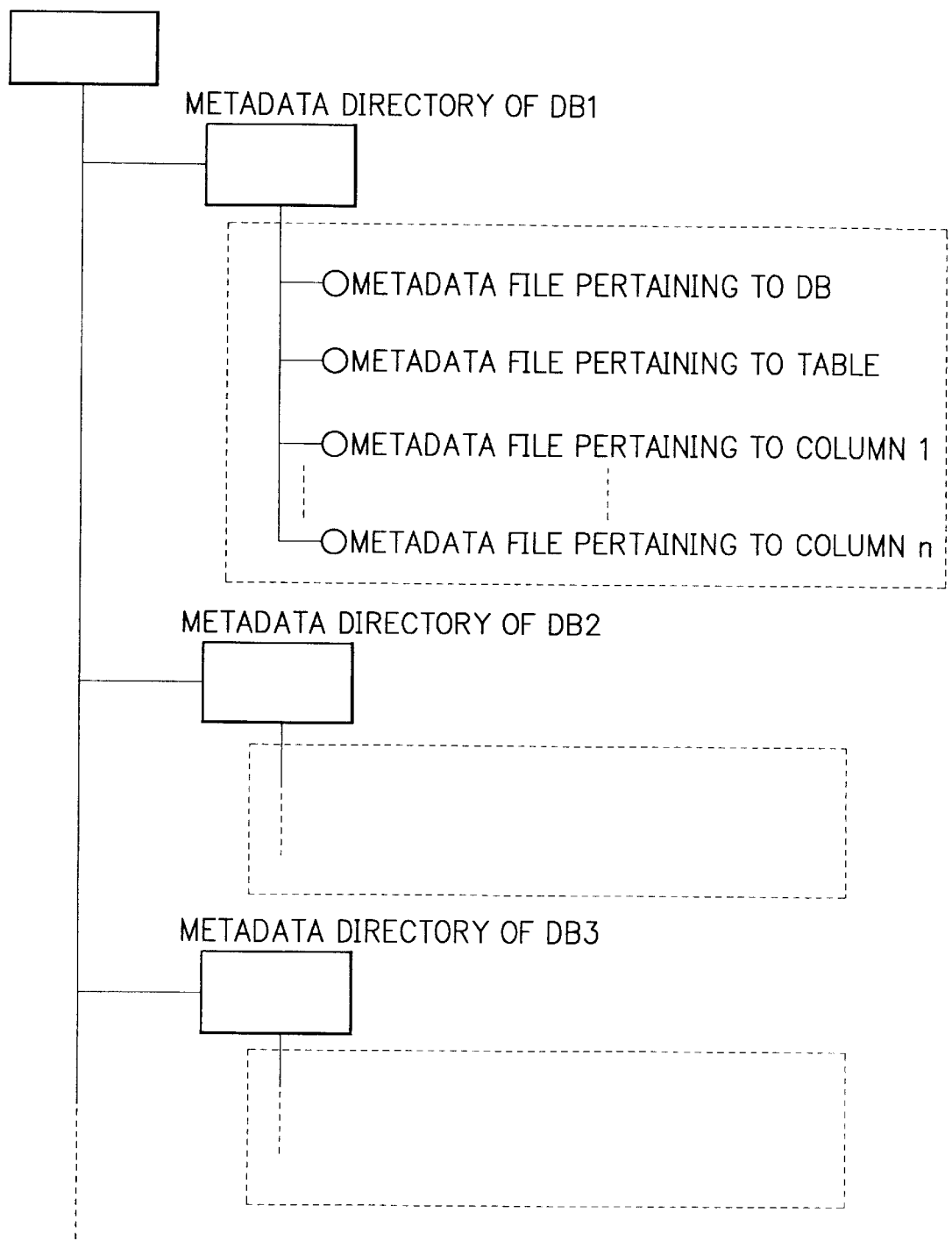
FIG. 7 shows an example of the directory structure (layer structure) of metadata.

FIG. 7 shows an example of the directory structure of the metadata 33. FIG. 7 shows an example wherein one DB server 30 manages a plurality of DBs 20 (DB1, DB2, DB3, . . . ). As shown in FIG. 7, the directory of each DB contains a metadata file pertaining to that DB, a metadata file pertaining to tables that form the DB, and a metadata file pertaining to columns 1 to n in the tables.

FIG. 8 shows an example of the contents of the metadata file concerning the DB. As shown in FIG. 8, metadata for the DB include information DBKEY, DBEXPL, DBMS, DBLIMIT, SERIAL, CHECK, RETRY, EMAIL, TBLFILE, DBNAME, and SQLURL. Such information will be explained in turn below.

DBKEY indicates the keyword for the DB, and describes a keyword "demo, member" in FIG. 8. DBEXPL indicates the content comment of the DB, and describes a comment "member information" in FIG. 8. DBMS indicates the name of the DB system, which describes the name "OracleWorkgroupServer-7.3" in FIG. 8. DBLIMIT indicates the access limitations to the DB, and describes "allow@foo.co.jp;deny all" in FIG. 8. That is, DBLIMIT describes that accesses by users having addresses containing "@foo.co.jp" are granted, but accesses by other users are denied.

SERIAL indicates the serial number of metadata used for update checking, and describes "19971225000000", i.e., indicates that metadata have been updated on Dec. 25, 1997, in FIG. 8. CHECK indicates the time interval [sec] for update checking of metadata, and describes the time interval "3,600 sec" in FIG. 8. RETRY indicates the retry time interval [sec] when metadata update checking fails, and describes the time interval "600 sec" in FIG. 8.

EMAIL indicates the mail address of the administrator of the DB, and describes the address "dbnavi@foo.co.jp"in FIG. 8. TBLFILE indicates the file name that describes metadata pertaining to the tables of the DB, and describes the name "tables.html" in FIG. 8. DBNAME indicates the registered name of the DB, and describes the name "demo@navi.foo.co.jp" in FIG. 8. SQLURL indicates the URL of the retrieval execution request destination to the DB, and describes the URL "http://navi.foo.co.jp:8080/servlet/DBNAVI/service" in FIG. 8.

Although not shown, the metadata file of the tables and those for the columns describe a plurality of metadata having the same format as that of the metadata file of the DB shown in FIG. 8 but different contents. The metadata for the tables include information COLFILE, TBLNAME, DBNAME, TBLOWNER, TBLNAME2, TBLKEY, TBLEXPL, TBLDATE, TBLMODIFY, NCOLS, NROWS, and TBLLIMIT. Such information will be described in turn below.

COLFILE indicates the file name that describes metadata pertaining to the columns, TBLNAME indicates the table name, and DBNAME indicates the DB name, which are the same as those described in the metadata file for the DB shown in FIG. 8. TBLOWNER indicates the owner name of the table, TBLNAME2 indicates the table name in Japanese, TBLKEY indicates the keyword pertaining to the tables, TBLEXPL indicates the content comments of the tables, TBLDATE indicates the creation date of the tables, TBLMODIFY indicates the update timing of the tables, NCOLS indicates the number of columns in the tables, NROWS indicates the number of rows in the tables, and TBLLIMIT indicates an access limitation to the tables.

Also, metadata for the columns include information COLNAME, DBNAME, TBLNAME, TBLOWNER, COLNAME2, CODEFILE, COLKEY, COLEXPL, COLHANDLER, COLHINFO, COLATTR, COLTYPE, COLUNIT, and COLSIZE. Such information will be explained in turn below.

COLNAME indicates the column name. DBNAME indicates the DB name, which is the same as that in the metadata file for the DB. TBLNAME indicates the table name, and TBLOWNER indicates the owner name of the table, which are the same as those in the metadata file for each table. COLNAME2 is the column name in Japanese, and CODEFILE indicates the storage location of a metadata file pertaining to a code which indicates the contents of the column. COLKEY indicates the keyword pertaining to the column, COLEXPL indicates the content comment of the column, COLHANDLER indicates the method of handling the column, COLHINFO indicates the handling information of the column, COLATTR indicates the limitation attribute on the column, COLTYPE indicates the type of data stored in the column, COLUNIT indicates the unit of data stored in the column, and COLSIZE indicates the size of data stored in the column.

Furthermore, the metadata for the code include information CODENAME, DBNAME, CODENAME2, CODEKEY, and CODEEXPL. CODENAME indicates the code name, and DBNAME indicates the DB name, which is the same as that in the metadata file for the DB. CODE-NAME2 indicates the code name in Japanese, CODEKEY indicates the keyword pertaining to the code, and CODE-EXPL indicates the content comments of the code.

Referring back to FIGS. 2 and 3, the meta DB server 40 collects the metadata 33 of the DBs 20 from at least one DB server 30 present on the network, and creates a meta DB 41. The meta DB 41 is created and managed by a meta DB management module 42 that consists of DB management program. The metadata 33 on the DB server 30 are collected periodically in response to a request from the meta DB management unit 42 or upon updating the DB server 30 or metadata 33.

The meta DB server 40 is installed with an HTTPD 43 comprising a meta DB retrieval receiving module 43a and retrieval request creation module 43b. When the user terminal 10 issues a retrieval request to the meta DB 41, the meta DB retrieval receiving module 43a receives that request to search for corresponding metadata, and sends the retrieval result to the user terminal 10 in the HTML format. The retrieval request creation module 43b creates a retrieval condition to be issued to the DB server 30 to search the DB 20 for real data in response to an instruction from the user who responded upon checking the retrieval result of the meta DB 41.

The user terminal 10, DB 20, DB server 30, and meta DB server 40 with the aforementioned arrangements are connected in practice to a network 50, as shown in FIG. 3. In FIG. 3, these apparatuses 10 to 40 are connected one each to the network 50, but a plurality of apparatuses may be respectively connected. In a distributed DB system, a plurality of apparatuses are normally present.

More specifically, one or more user terminals 10 are present on the network 50. One or more DB servers 30 and one or more DB servers 40 are visible to each user terminal 10, but the DBs 20 are invisible to the user terminal 10.

As described above, one or more DBs 20 are present on the network 50. Physically, the DB 20 may be mounted in the same apparatus as the DB server 30. The number of DB servers 30 is not limited when viewed from each DB 20.

Also, one or more DB servers 30 are present on the network 50. The number of DBs 20 is not limited when viewed from each DB server 30. Note that the conventional DB server has neither the metadata providing module 31b nor metadata 33.

Furthermore, one or more meta DB servers 40 are present on the network 50. A plurality of user terminals 10 and DB servers 30 may be visible to each meta DB server 40, but the DBs 20 are invisible to the meta DB server 40.

Conventionally, when desired data is retrieved from one of the DBs 20 distributed on the network 50, the user must connect to one or more DB servers 30 in turn to search the DBs 20. However, in this embodiment, the user connects to the newly added meta DB server 40 first to search for metadata, thus detecting the DB 20 that stores real data to be retrieved. After that, a retrieval condition to be issued to the DB server 30 corresponding to that DB 20 is created and issued from the retrieval request transfer module 11b to the DB server 30, thus obtaining the retrieval result.

The operation of the database system according to this embodiment with the above arrangement will be explained below.

As preparation prior to search, the administrator of the DB server 30 creates metadata 33 of the DB 20 managed by that server. The created metadata 33 are sent to the meta DB server 40 in response to a request from the meta DB server 40. The meta DB server 40 collects the metadata 33 from the plurality of DB servers 30 to create the meta DB 41.

Upon actual search, the user inputs a desired keyword to search the meta DB 41 of the meta DB server 40 for metadata. With this search, one or more metadata that match the input keyword are extracted from the meta DB 41. Since each metadata contains the URL of the corresponding DB 20 or DB server 30, the user can find out the DB 20 that stores real data to be retrieved at that time, and can select the DB 20 to be accessed. Of course, the user can access all the DBs 20 found by search.

The user who obtained the retrieval result of the metadata creates a retrieval condition to be issued to the DB server 30 to search the DB 20 for real data. A GUI control window used for creating the retrieval condition is provided to the user terminal 10 on the basis of the retrieval result and the like of metadata by the meta DB server 40. When the user presses a GUI button for starting search after he or she created the retrieval condition, a retrieval request having that retrieval condition is directly transferred to the DB server 30 without the intervention of the meat DB server 40, thus retrieving real data. The retrieval result is sent back to and displayed on the user terminal 10.

The retrieval result that the meta DB server 40 presents to the user terminal 10 may often simultaneously include a plurality of DB servers 30 or DBs 20. In such case, the GUI control window for creating the retrieval condition provided by the meta DB server 40 is displayed in the predetermined format without exception. Hence, the user can create a retrieval condition irrespective of a plurality of distributed DB servers 30 or DBs 20, and can issue it to a desired DB server 30 in accordance with the URL contained in the metadata retrieval result.

In this manner, according to the database system of this embodiment, when the user initially makes a plausible search using metadata, he or she can extract a plurality of metadata that matches an input appropriate keyword from the meta DB 41. The extracted metadata summarize the contents and the like of one or more DBs 20. Hence, the user can easily obtain information of all the DBs 20 that match his or her required keyword, independently of the locations of the distributed DBs 20 (DB servers 30).

More specifically, the user can obtain information of all the different DBs 20 from the single meta DB server 40 by a single search without requiring immediate connectivity to the DBs 20 (DB servers 30). Since the locations (URLs) of the extracted DBs 20 (DB servers 30) are contained in the metadata, which are presented to the user, the user need only know the location (URL) of the meta DB server 40. Therefore, the user need not perform any troublesome operations, e.g., for detecting and accessing all distributed DB servers 30 in turn.

In addition, the latest information (metadata) of each DB 20 present on the network 50 is sent to the meta DB server 40 via periodic communications between the DB server 30 and meta DB server 40. Thus, the latest information at the time of search can be obtained as a retrieval result from the contents of the meta DB 41, thus realizing accurate data retrieval. The metadata in the meta DB 41 are automatically updated between the DB server 30 and meta DB server 40. As a result, the user need not understand the complex processes of registration and deletion of data constantly done by the DB server 30 or connection/disconnection of the DB server 30 itself to the network 50.

Furthermore, in this embodiment, when the metadata 33 has been updated on the DB server 30, the updated metadata is transmitted not actively from the DB server 30 to the meta DB server 40 but in response to a request from the meta DB server 40. With this control, the DB server 30 is completely independent from the meta DB server 40. Hence, the DB server 30 need not know the meta DB server 40 to which it provides metadata. The meta DB server 40 can rewrite the contents of the meta DB 41 on the basis of metadata sent from all the active DB servers 30 in response to a request from itself.

In this embodiment, only one meta DB server 40 is present on the network 50. However, one or more meta DB servers 40 may be present. If a mirror server having the same or different contents as or from those of the meta DB server 40 is added, reaction of the meta DB server 40 in response to the request from the user terminal 10 can be prevented from being delayed due to heavy traffic on the network.

The operation of the database system according to this embodiment mentioned above will be described in detail below with reference to the flow charts shown in FIGS. 4 to 6.

Figure 4:
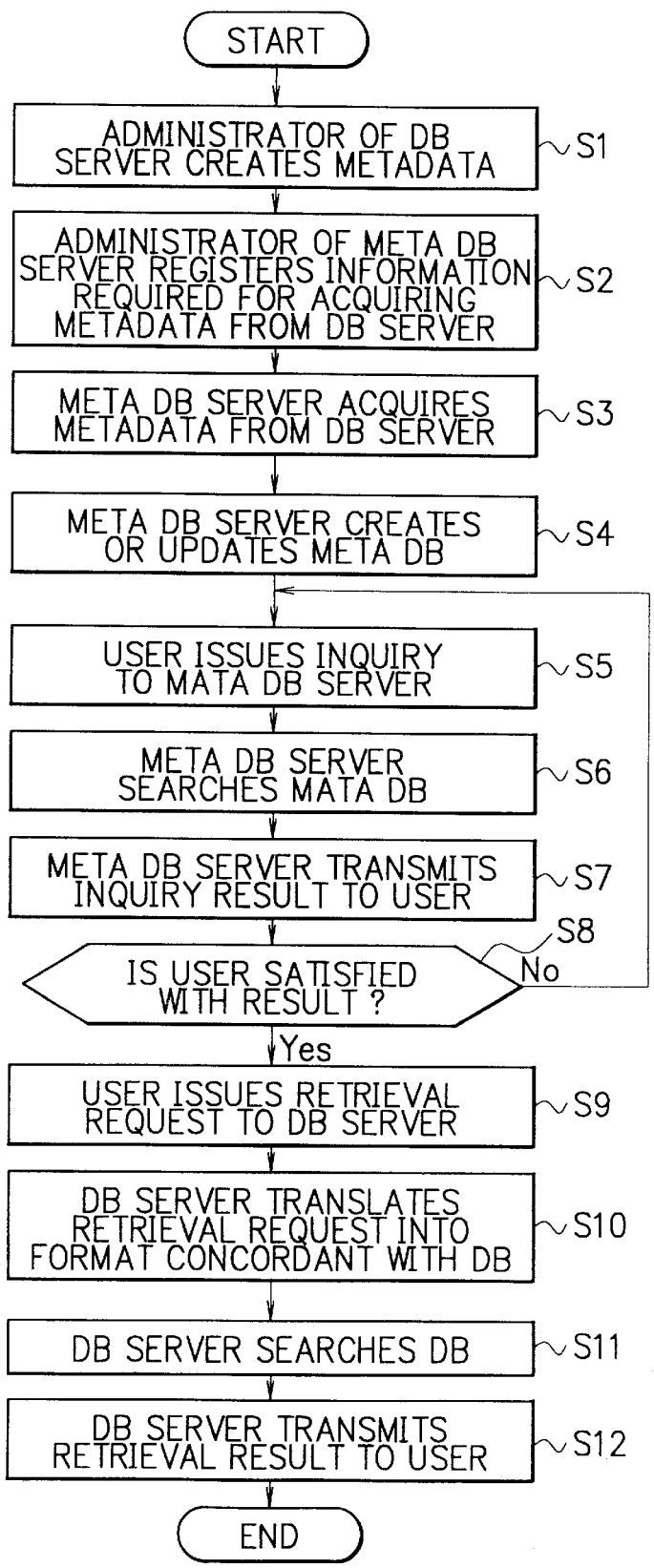
FIG. 4 is a flow chart showing the flow of the overall processing of the database system according to the first embodiment.
Figure 5:
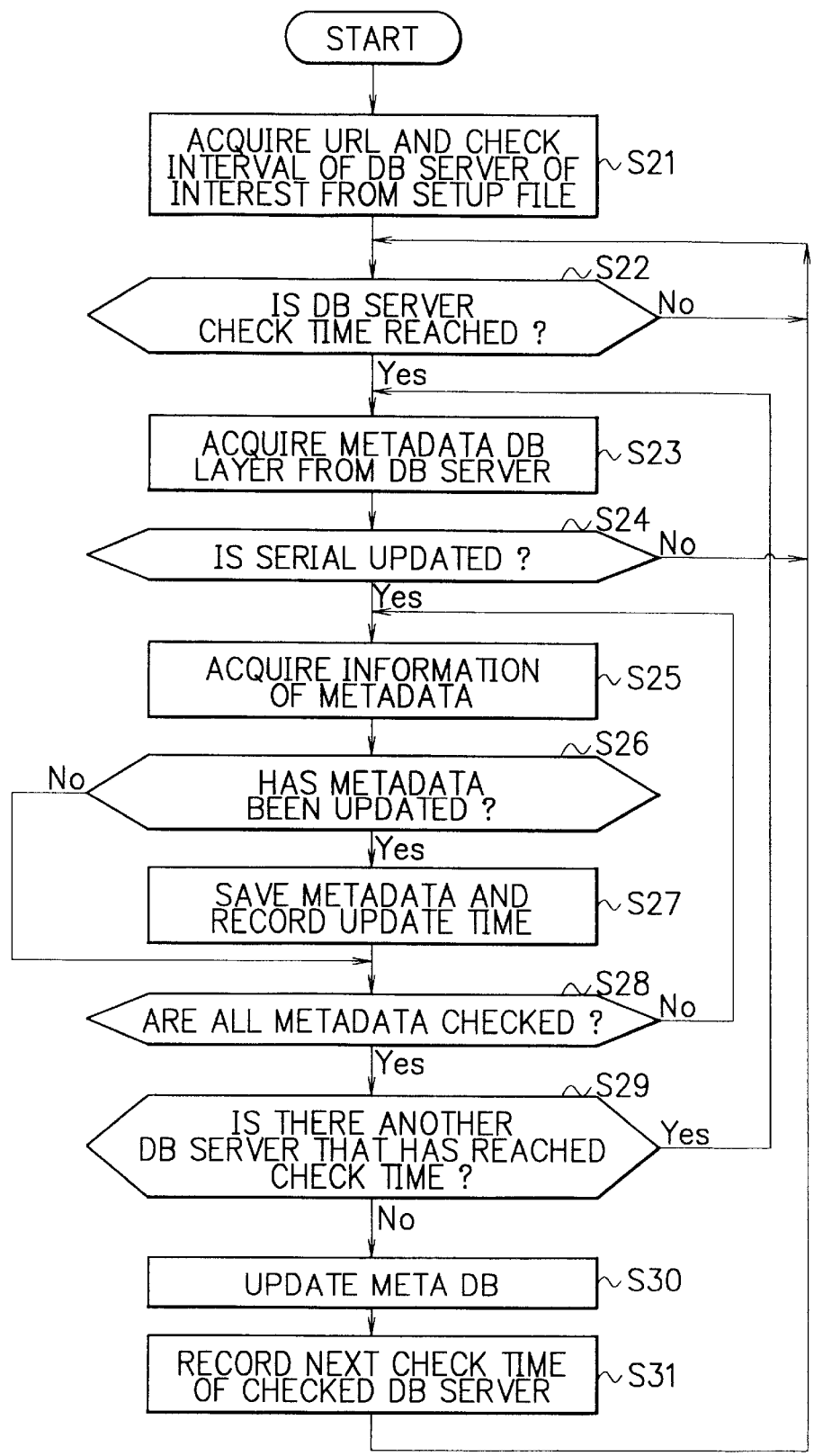
FIG. 5 is a flow chart showing the flow of meta DB update processing in the database system according to the first embodiment.
Figure 6:
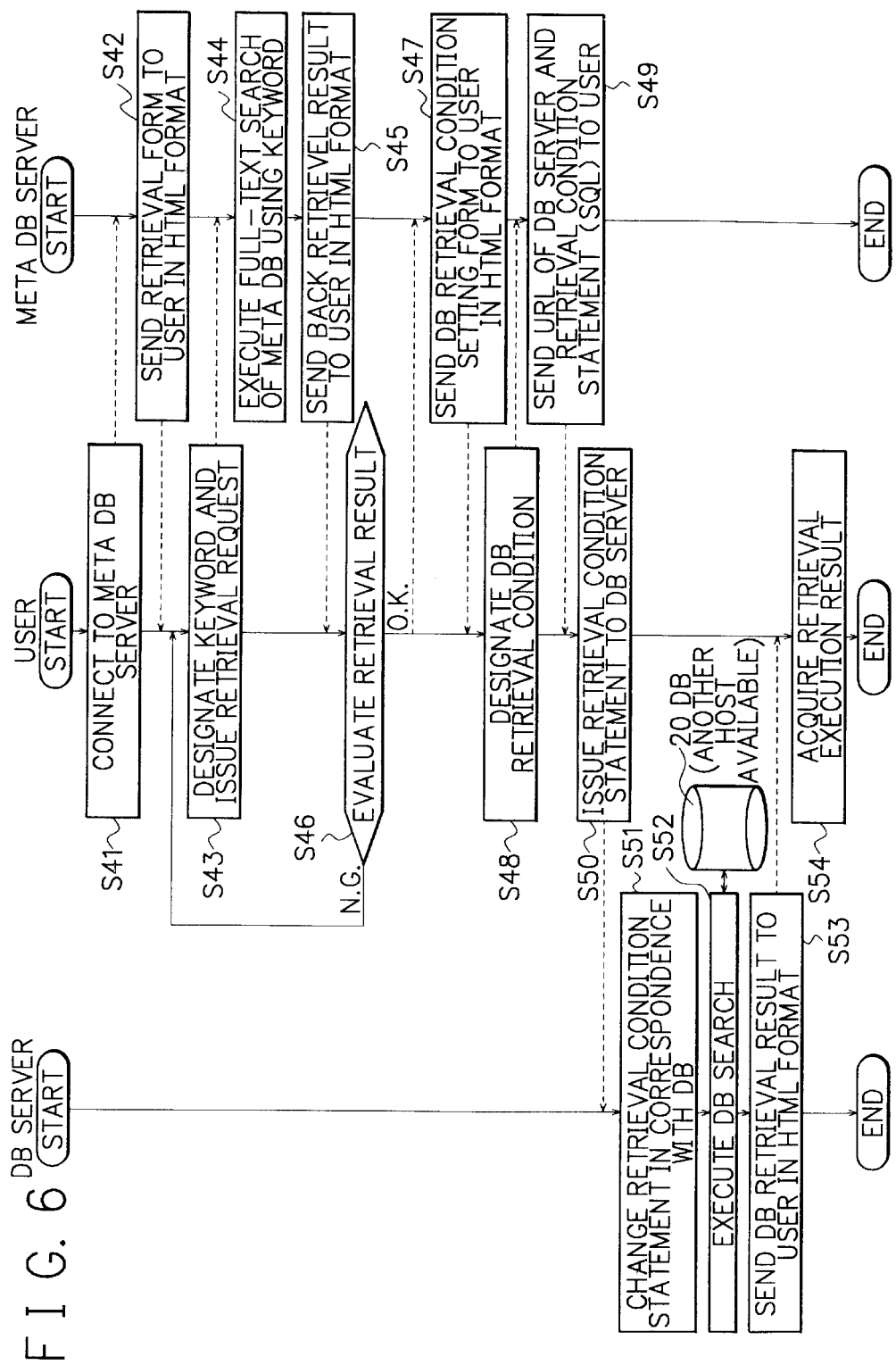
FIG. 6 is a flow chart showing a series of retrieval processes of the database system according to the first embodiment in correspondence with a user terminal, DB server, and meta DB server.

Note that FIG. 4 is a flow chart showing the flow of the overall processing, FIG. 5 is a flow chart showing the flow of meta DB update processing (by a meta DB management program), and FIG. 6 is a flow chart showing a series of search processes in correspondence with the user terminal 10, DB server 30, and meta DB server 40.

Referring to FIG. 4, the administrator of the DB server 30 creates and registers metadata 33 that pertain to the DB 20 in step S1. These metadata 33 can be looked up from other machines on the network 50 via the HTTPD 31 on the DB server 30. In this embodiment, in order to accurately and efficiently search the meta DB 41, the metadata 33 can be created in a plurality of layers, as shown in, e.g., FIG. 7.

For example, this embodiment assumes a table style relational database as the DB 20, and uses a four-layered structure, i.e., a DB layer, table layer, column layer, and code layer. The DB layer describes information that pertains to the overall DB 20, the table layer describes information that pertains to tables in the DB 20, the column layer describes information that pertains to columns (items) in the tables, and the code layer describes information that pertains to values in the columns. Each layer includes the contents and keyword of that layer, and at least the DB layer includes the URL of the DB 20 (destination of the retrieval condition).

In step S2, the administrator of the meta DB server 40 registers information required for acquiring metadata 33 from the DB servers 30, i.e., information of each DB 20 provided by the DB server 30 in a predetermined file in correspondence with DB servers 30 to be supported. An item mandatory for registration is at least the URLs of the DB layer metadata files of the respective DBs 20.

After information of each DB 20 to be supported is registered, the meta DB server 40 acquires metadata 33 pertaining to the registered DBs 20 from the DB servers 30 in step S3, and registers the acquired metadata 33 in the meta DB 41 in step S4. More specifically, the meta DB server 40 collects all metadata 33 from a plurality of registered DB servers 30, and creates the meta DB 41 based on these data by modifying the collected data so as to provide better service to the user.

When the administrator of the meta DB server 40 wants to add a new DB 20 to be supported, he or she need only add one sentence describing information of the corresponding DB 20 in the above-mentioned file.

In this way, the meta DB server 40 automatically reads metadata 33 from the corresponding DB server 30 and updates the contents of the meta DB 41. As described above, this embodiment can provide a flexible system which can very easily add or delete DBs 20 to be supported.

The preparation prior to search is completed. After that, when a search is made actually, the user inquires of the meta DB server 40 using the WWW browser 11 in step S5. Then, the meta DB server 40 searches for DBs 20 that match the user's inquiry using the meta DB 41 in step S6. Then, a retrieval condition creation form page (GUI control window) is formed using the retrieval result and metadata and sends it to the user terminal 10 in step S7.

The user checks in step S8 if the retrieval result is satisfactory. If the result is not satisfactory, the flow returns to step S5, and the user inputs a keyword different from the previous one to redo search. If the user is satisfied with the retrieval result, the flow advances to step S9. In step S9, the user creates a retrieval condition used for retrieving real data from the extracted DB 20 using the presented retrieval condition creation form page, and issues it as a retrieval request to the DB server 30.

Assuming the above-mentioned relational DB, the location of information to be retrieved (i.e., the table and column locations in the corresponding DB 20) and various other conditions may be input as the retrieval condition. The retrieval condition to be input can be freely determined depending on the application used. When a relational DB is used, the retrieval request to the DB server 30 is created and issued in accordance with the SQL format. The destination of the retrieval request is presented in the form of URL in metadata, and the retrieval request is automatically issued to the destination upon operation of a retrieval execution button.

Upon receiving the retrieval request, the DB server 30 translates the retrieval request into the format the matches the DB 20 in step S10. More specifically, the retrieval condition is created between the user terminal 10 and meta DB server 40 in a predetermined format irrespective of the types of DBs 20 distributed on the network 50. For this reason, when the retrieval request is actually issued to the individual DBs 20, a standard retrieval request is converted to a format that can be interpreted by each DB 20.

In this way, the user need only create and issue a retrieval condition according to a standard format using the above-mentioned retrieval condition creation form presented by the meta DB server 40 without requiring immediate connectivity to the individual distributed DBs 20. That is, DBs 20 on the network 50 appear equivalent to each other from the user side, and disparate, distributed DBs 20 can be integrated.

Upon reception of the translated retrieval request, the DB server 30 issues a retrieval request (SQL) to the DB 20 in place of the user to retrieve real data in step S11. The retrieval result is sent back to the user terminal 10 and displayed in step S12, thus ending a series of search processes.

The update processing (steps S3 and S4 in FIG. 4) of the meta DB 41 by the meta DB server 40 will be described in detail below with reference to FIG. 5.

Referring to FIG. 5, the URL of each DB server 30 to be supported and its check interval are acquired from a setup file in the meta DB management module 42 in step S21.

The check interval indicates the time interval upon periodically issuing a collection request of metadata 33 from the meta DB server 40 to the DB server 30. The check interval may be set in advance in the meta DB server 40, or the administrator of the DB server 30 may describe the interval in metadata 33 upon creating metadata 33 and transmit the metadata 33 to the meta DB server 40 to store the interval in the setup file.

In step S22, the control waits based on the set check interval until the check timing of the DB server 30 is reached. If the check timing has been reached, the flow advances to step S23 to acquire information of the DB layer of the metadata 33 from the DB server 30. The DB layer contains serial number data, which is counted up every time the contents of the metadata 33 have been updated. By checking this data in step S24, it can be determined if the metadata 33 has been changed.

If the metadata 33 remains the same, the flow returns to step S22 to wait until the next check timing. On the other hand, if the metadata 33 has been changed, the flow advances to step S25 to acquire the information of that metadata 33 from the DB server 30. It is checked in step S26 if the metadata 33 has been updated. If the metadata 33 has already been updated, new metadata 33 is saved, and its update time is recorded in step S27.

It is then checked in step S28 if all the metadata 33 that pertain to the DB 20 which is being checked have been examined. If metadata 33 remain unexamined, the flow returns to step S25 to acquire such metadata. If all the metadata 33 have been examined, it is checked in step S29 if there is another DB server 30 that has reached the check timing. If such server is found, the flow returns to step S23 to repeat the above processing.

In this way, after all the metadata 33 that pertain to the corresponding DBs 20 are acquired from all the DB servers 30 that have reached the check timing, the contents of the meta DB 41 are updated based on the acquired information in step S30. The next check timings of the checked DB servers 30 are recorded in step S31, and the flow then returns to step S22.

A series of search processes (steps S5 to S12 in FIG. 4) executed by the user terminal 10, DB server 30, and meta DB server 40 will be described in detail below with reference to FIG. 6.

Referring to FIG. 6, the user connects the user terminal 10 to the meta DB server 40 via the network in step S41. In response to this connection, the meta DB server 40 sends a search form of the meta DB 41 to the user terminal 10 in the HTML format in step S42.

The user designates a keyword using the above-mentioned search form, and issues a retrieval request to the meta DB server 40 in step S43. In response to the request, the meta DB server 40 executes a full-text search of the meta DB 41 using the input keyword in step S44, and sends back the retrieval result to the user terminal 10 in the HTML format in step S45. The user evaluates the retrieval result in step S46, and if the result is satisfactory, he or she sends a message indicating this to the meta DB server 40.

The meta DB server 40 forms a retrieval condition creation form for the DB 20 in the HTML format using the retrieval result of the meta DB 41 and metadata, and sends it to the user terminal 10 in step S47. The user designates the retrieval condition of the DB 20 using the presented retrieval condition creation form, and sends it to the meta DB server 40 in step S48. The meta DB server 40 sends the received retrieval condition text (SQL) and the URL of the DB server 30 corresponding to the DB 20 as the destination of the text to the user terminal 10 in step S49.

Upon reception of such information, the user terminal 10 issues a retrieval condition statement (SQL) to the DB server 30 indicated by the received URL as a retrieval request in step S50. Upon reception of the retrieval request, the DB server 30 translates the retrieval request into the format concordant with the DB 20 in step S51. The DB server 30 issues a retrieval request (SQL) to the DB 20 to retrieve real data in step S52, and transmits the obtained retrieval result to the user terminal 10 in step S53. The user terminal 10 acquires the retrieval execution result in step S54, thus ending a series of search processes.

The above-mentioned embodiment has exemplified the distributed DB system built by connecting the user terminal 10, DB 20, DB server 30, and meta DB server 40 to the Internet. However, the network to be connected is not limited to the Internet. For example, this embodiment can be applied to networks other than the Internet such as a WAN (Wide Area Network), LAN (Local Area Network), intranet, and the like.

In the above embodiment, a relational DB has been exemplified as the DB 20. However, the present invention is not limited to such specific DB. Also, the DB can manage various kinds of data contents such as text data, image data, audio data, and the like.

Second Embodiment

The second embodiment of the present invention will be described below with reference to the accompanying drawings.

Figure 9:
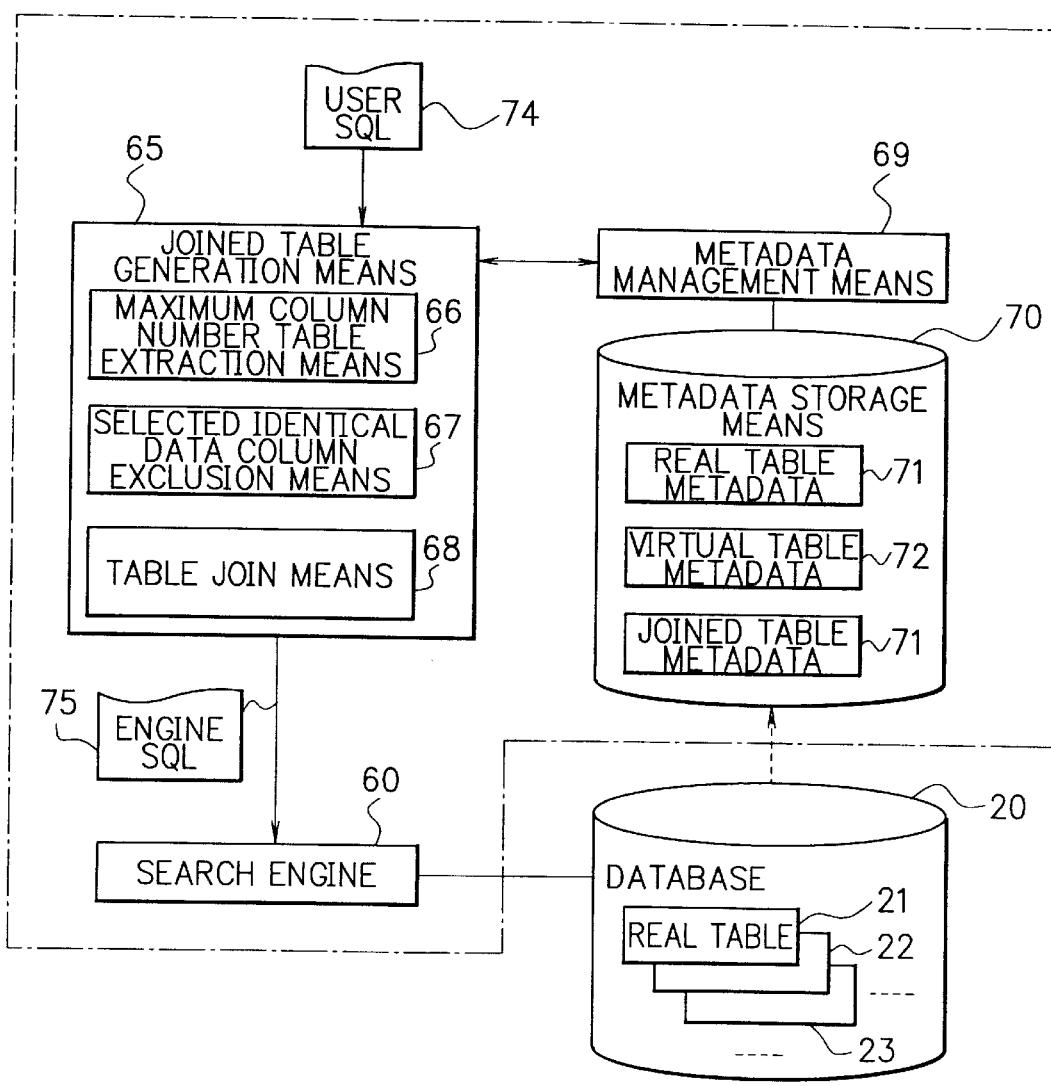
FIG. 9 is a block diagram showing an example of the arrangement of a database system according to the second embodiment of the present invention.

FIG. 9 is a block diagram showing an example of the arrangement of a database system according to this embodiment. The database system of this embodiment shown in FIG. 9 can be used alone or may be combined with the first embodiment shown in FIG. 2.

The combination with the first embodiment can be implemented when the DB server 30 shown in FIG. 2 comprises functional blocks bounded by the one-dashed chain line in FIG. 9 other than the database 20. On the other hand, the DB server 30 in FIG. 2 may comprise only a search engine 60 and joined table generation means 65 shown in FIG. 9, and the meta DB server 40 may comprise a metadata management means 69 and metadata storage means 70 shown in FIG. 9.

When the database system of this embodiment is combined with the first embodiment, in metadata to be used, other joinable DB names (JOINABLE) are added into the DB layer file, map information (JOINMAP) that describes the correspondence between a plurality of tables represented by a virtual table (to be described later) and columns is added into the table layer file, and a real column name (REALCOL) is added into the column layer file.

The functional blocks shown in FIG. 9 will be explained below. Reference numeral 60 denotes a search engine which searches data in the database 20 on the basis of a retrieval condition requested by an SQL statement. The database 20 stores a plurality of real tables 21, 22, 23, . . . These real tables 21, 22, 23, . . . are stored in a format that clears the limitations of the RDBMS, and the search engine 60 can search the respective real tables.

Reference numeral 69 denotes a metadata management means which manages metadata that pertain to the plurality of real tables 21, 22, 23, . . . Note that the metadata is information used for managing data such as the attributes, semantic contents, acquisition sources, storage locations, and the like of data stored in the real tables 21, 22, 23, . . . , and is the same as that described in, e.g., the first embodiment. The metadata is periodically or non-periodically acquired from the database 20, and is stored in a metadata storage means 70. The metadata management means 69 stores the metadata in the metadata storage means 70, and reads out and uses it.

For example, since the database 20 stores the real tables 21, 22, 23, . . . in FIG. 9, the metadata management means 69 acquires the table names of the real tables 21, 22, 23, . . . and the column names of columns that form the tables, and stores them as real table metadata 71 in the metadata storage means 70. Since such information to be stored has a format that can be easily described by text data, the administrator or the like may manually create and store it.

Also, information that pertains to joining of the plurality of tables is managed by the metadata management means 69 as virtual table metadata 72. For example, in case of metadata of a virtual table formed by the two real tables 21 and 22, the table names of the real tables 21 and 22 and all the column names of these tables are stored as metadata. Similarly, in case of a virtual table formed by the three real tables 21, 22, and 23, the three table names and all the column names of these tables are stored.

Reference numeral 65 denotes a joined table generation means, which is comprised of a maximum column number table extraction means 66, selected identical data column exclusion means 67, and table join means 68. The joined table generation means 65 has a function of a new virtual table by extracting only required columns from the plurality of real tables 21, 22, 23, . . . on the basis of the metadata managed by the metadata management means 69. In this embodiment, predetermined columns are joined like a conventional view, but the virtual table joined according to this embodiment has a format different from the conventional view.

The maximum column number table extraction means 66 extracts a real table having the maximum number of columns that store data to be retrieved from the real tables 21, 22, 23, . . . on the basis of metadata managed by the metadata management means 69. At this time, when a column having the same data contents as those in a column included in the extracted real table is also present in another real table, that column is handled as the one which belongs to the extracted real table alone.

The selected identical data column exclusion means 67 excludes columns that store the same data contents as those in the columns in the extracted real table from the columns included in the remaining real tables in the subsequent table join processing, every time the maximum column number table extraction means 66 extracts one real table.

The maximum column number table extraction means 66 extracts a real table with the maximum number of columns from the remaining real tables except for those extracted so far again while the corresponding columns are excluded by the selected identical data column exclusion means 67. Likewise, the processing for extracting the real table with the maximum number of columns to be retrieved and the processing for excluding columns that store the same data as those in the extracted real table are repeated.

The table join means 68 joins one or more real tables extracted in turn by the maximum column number table extraction means 66 to create a logically single joined table (virtual table) from one or more real tables. The information of the joined table is managed as joined table metadata 73 by the metadata management means 69.

As described above, in this embodiment, since columns which are included in different real tables but store identical data contents are handled as the ones that belong to one real table, the table join means 68 never joins tables more than required. Also, real tables which do not store any data to be retrieved are not extracted as the tables to be joined.

When the user searches the database, no unnecessary real table is selected as the tables to be joined, and a single joined table can be formed by a minimum required number of real tables. Also, metadata that pertain to joining of the plurality of real tables 21, 22, 23, . . . can be collected and managed by the single metadata management means 69, thus forming a long view beyond the physical limitations on the database. That is, a table which can be seen as one table from the user, and can be seen as a plurality of joined tables from a database management system (DBMS) can be formed.

Referring to FIG. 9, an SQL statement 74 input to the joined table generation means 65 is input by the user to conduct actual search. At this time, the user can search the virtual table managed by the metadata management means 69. More specifically, the user can input a retrieval condition disregarding the limitations on the number of columns. When the SQL statement 74 input by the user includes a command for search within a breadth beyond the limitations on the number of columns of the RDBMS, the joined table generation means 65 performs the aforementioned processing to output a search engine SQL statement 75.

The search engine SQL statement 75 is output from the joined table generation means 65 in the format that allows the search engine 60 to search. The search engine SQL statement 75 searches the joined table obtained by selecting a minimum required number of columns by excluding unnecessary columns. This information is managed by the metadata management means 69. For example, since the joined table is the joined table metadata 73 indicating columns of the real tables that form a joined table, the search engine 60 can perform search using this table.

The operation for generating the joined table according to this embodiment with the above arrangement will be described in detail below with reference to FIGS. 10 to 13. Assume that data to be retrieved pertains to columns x1, x4, x8, and x9 on view X upon searching a database which is the same as that shown in FIG. 13.

As shown in FIG. 10, column x1 on view X corresponds to columns a1, b1, and c1 on real tables A, B, and C, column x4 on view X to column a4 on real table A, column x8 on view X to columns b5 and c2 on real tables B and C, and column x9 on view X to column c3 on real table C. The join processing of this embodiment selects one real column corresponding to each of four columns x1, x4, x8, and x9 including data to be retrieved so as to minimize the number of joined tables upon search.

More specifically, there are a total of seven columns (links 1 to 7 indicated by the arrows) on the real tables A, B, and C that pertain to four columns x1, x4, x8, and x9 on view X, and four columns (links) are selected from these seven columns (links) by the following processing.

First, a real table having the largest number of links (the number of columns including data to be retrieved) is extracted from real tables A, B, and C. In the initial state before joining tables, real table A includes two columns a1 and a4, real table B includes two columns b1 and b5, and real table C includes three columns c1, c2, and c3. Hence, since real table C has the largest number of links (the number of columns to be selected), it is selected, as shown in FIG. 11.

Links 4, 6, and 7 tied to selected real table C are then selected, and links 1, 3, and 5 corresponding to columns a1, b1, and b5 that store the same data as those in columns c1, c2, and c3 on real table C are deleted. In this way, columns x1, x8, and x9 on view X handle those belonging to real table C alone. Note that link 2 which remains undeleted is carried over to the subsequent processing.

Subsequently, the processing for excluding a real table with the largest number of links (the number of columns to be selected for search) from remaining real tables A and B excluding selected real table C is executed again. In this case, since the number of links for real table A is 1, and the number of links for real table B is zero, real table A is selected, as shown in FIG. 12, and link 2 tied to real table A is selected. As a consequence, the number of unsolved links becomes zero, thus ending the processing.

Figure 13:
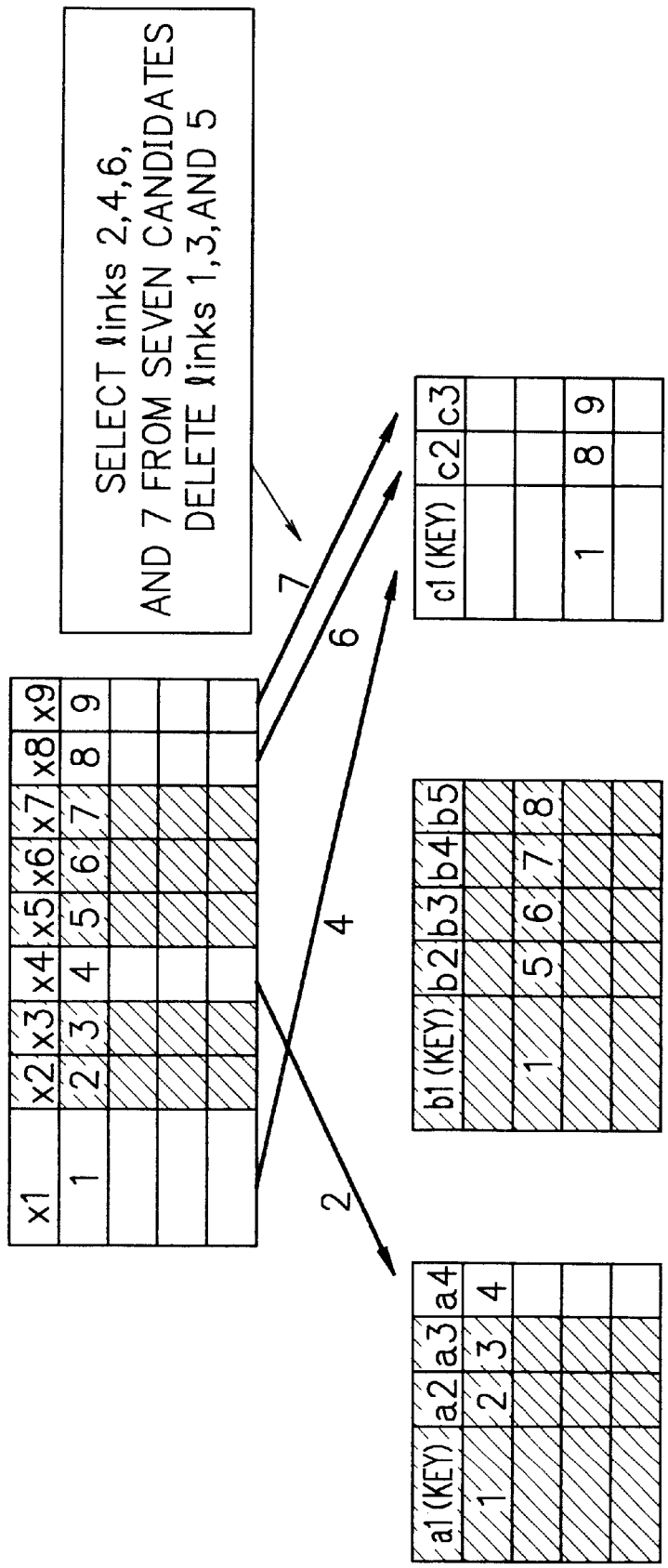
FIG. 13 is a view for explaining the retrieval operation of the database system according to the second embodiment (a data retrieval method according to this embodiment).

As a result of the above processing, as shown in FIG. 13, real tables A and C are selected as those including columns x1, x4, x8, and x9 that store data to be retrieved from three real tables A, B, and C. Of seven links 1 to 7 tied to three real tables A, B, and C, four links 2, 4, 6, and 7 are selected, and remaining links 1, 3, and 5 are deleted. Then, a join condition is appended between two selected tables A and C. In this way, a new table is formed by four columns, i.e., column a4 on real table A, and columns c1, c2, and c3 on real table C. This table is the aforementioned joined table (virtual table).

In this embodiment, since high-grade SQL analysis is done as pre-processing of the so-called DBMS, only a join condition required for search can be produced, and the number of tables to be joined can be reduced. In this way, the memory area of the computer can be prevented from being wasted, and the generation time of a search signal (Query) and the search response time can be shortened.

In this embodiment, the number of real tables is three. However, the present invention is not limited to such specific number of tables. In general, as the number of real tables becomes larger, the join process becomes more complicated, and the load on the computer becomes very heavy. However, the database system of this embodiment is particularly effective when the number of real tables is large.

Each of the above embodiments is implemented by supplying a software program code that implements the function of the embodiment to a computer. in an apparatus or system connected to various devices so as to operate the devices to implement the functions, and by operating the devices according to a program stored in the computer (CPU or MPU) of the system or apparatus. Alternatively, each embodiment may be implemented by hardware.

In this case, the software program code itself implements the functions of the above embodiment, and the program code itself and means for supplying the program code to the computer, e.g., a recording medium that stores the program code constitutes the present invention. As a recording medium that stores the program code, for example, a floppy disk, hard disk, optical disk, magnetooptical disk, CD-ROM, magnetic tape, nonvolatile memory card, ROM, and the like may be used.

The program code is also included in the present invention, when the functions of the above embodiment are implemented not only by executing the supplied program code by the computer but also in collaboration of the program code and an OS (operating system), another application program, or the like, which is running on the computer.

Furthermore, the present invention also includes a case wherein the supplied program code is stored in a memory mounted on a function extension board of the computer or a function extension unit connected to the computer, and a CPU or the like mounted on the function extension board or unit executes some or all of actual processes on the basis of the instruction of the program code to implement the functions of the embodiment.

As described in detail above, according to the present invention, since metadata that pertain to real data stored in one or more databases are collected and managed by a second server, and metadata that match a retrieval condition are extracted by search of the second server, even when a plurality of databases and first servers that manage these databases are present, all metadata that match the retrieval request can be extracted by search of the second server. For this the user can obtain information of different databases from a single second server without requiring immediate connectivity to the distributed databases (first servers). That is, the user need not make any cumbersome operations for detecting and accessing all the distributed first servers one by one, and can easily find a database that stores desired real data.

According to another feature of the present invention, since the first server comprises means for converting a retrieval request for a database transferred from a user terminal into a format that matches the database to be accessed, the user need only create and issue a retrieval condition according to a standard format without taking notice of the sites of the individual distributed databases, thus integrating different types of distributed databases and facilitating user's search operation.

According to still another feature of the present invention, since the second server comprises a function of acquiring metadata when the first server has updated the metadata or at predetermined time intervals, the latest information at the time of search can be obtained as a retrieval result from the metadata collected by the second server, thus realizing accurate data search and flexibly coping with system changes. Since such updating of metadata is done automatically, the user need not understand the complex processes of registration and deletion of data constantly done by the first servers or connection/disconnection of the first server itself to the network, thus reducing the load on the user.

According to still another feature of the present invention, processing for extracting one table including columns that store data to be retrieved from a plurality of tables, and processing for excluding columns on the extracted table and those on other tables which store the same data contents as those on the extracted table from the columns to be extracted are repeated, and tables extracted in turn by the table extraction means are joined. Hence, columns which are located on different tables but store identical data contents are handled as those belonging to one table, and tables more than required can be prevented from joined. Also, a table which includes no columns that store data to be retrieved can be excluded from the tables to be joined, and one joined table can be generated using a minimum required number of tables. Hence, since a search can be made within a relatively narrow breadth obtained by excluding unnecessary tables, a database system which can attain high-speed processing while reducing the required memory capacity can be provided.

According to still another feature of the present invention, metadata that pertain to joining of a plurality of tables are collected and managed, and table extraction is done based on the metadata. Hence, a plurality of tables can be consistently managed by collecting the metadata, and a long view beyond the physical limitations such as the number of columns of a database can be created.

What is claimed is:

1. A database system built by distributing one or more databases and one or more first servers which search the databases for real data on a network, said first servers comprising first metadata saving means for saving metadata which pertain to real data stored in said one or more databases, wherein the database is a relational database, said system comprising:

a metadata database for collecting and managing metadata saved in said first metadata savings means;

metadata retrieval means for extracting metadata which matches a request from a user terminal connected to the network by searching said metadata database in response to said request;

real data retrieval means for directly retrieving real data corresponding to the extracted metadata from said one or more databases, wherein said real data retrieval means bypasses said metadata retrieval means when directly retrieving said real data, wherein said metadata contains at least information indicating a location of the database or the first server, and contents of real data in the database;

table extraction means for extracting one table including columns that store data to be retrieved from a plurality of tables in the database;

column exclusion means for excluding columns of the table extracted by said table extraction means and columns on other tables which store the same data contents as data contents of the columns on the extracted table from columns to be extracted in subsequent processing; and table joining means for joining the tables extracted in turn by said table extraction means when the processing of said table extraction means and the processing of said column exclusion means have been repeated until all the columns including data to be retrieved are analyzed, and the real data is retrieved from the tables joined by said table join means.

2. A system according to claim 1, wherein said metadata database and metadata retrieval means are located in one or more second servers different from the first servers.

3. A system according to claim 2, wherein the second server comprises means for acquiring corresponding metadata when data stored in said metadata saving means of said first servers has been updated.

4. A system according to claim 2, wherein the second server comprises means for acquiring data stored in said metadata saving means of said first servers at a predetermined time interval.

5. A system according to claim 1, wherein the user terminal comprises:

means for inputting a retrieval request of the metadata;

means for inputting a retrieval condition upon retrieving real data on the database using a retrieval result of the metadata supplied from said metadata retrieval means; and means for transferring the input retrieval condition to the first server indicated by the extracted metadata as a retrieval request.

6. A system according to claim 5, wherein said means for inputting a retrieval condition is an operational screen provided by said second servers.

7. A system according to claim 5, wherein the first server comprises means for converting the retrieval request to the database transferred from the user terminal into a format concordant with the database to be accessed.

8. A system according to claim 1, wherein said metadata has a structure divided into a plurality of layers.

9. A method of retrieving real data by a user from a network having a at least one distributed database having at least one database server associated therewith, the method comprising:

creating composite metadata relating to real data in all of the at least one distributed database;

storing the created composite metadata in a metadata database;

issuing an inquiry from the user to a server containing the metadata database;

searching the metadata database based upon the inquiry;

transmitting a search result from the server to the user;

bypassing the server containing the metadata database and issuing a real data retrieval request from the user to said at least one database server based upon the search result;

searching the at least one distributed database;

transmitting a retrieval result of real data to the user from said at least one distributed database; and updating the created composite metadata, wherein said updating includes checking for expiration of an update interval associated with said at least one database server.

10. The method of claim 9, further comprising registering information required for acquiring metadata from each of said at least one distributed database.

11. The method of claim 10, wherein said step of registering includes at least registering a URL or a database server location.

12. The method of claim 10, wherein said step of registering includes registering an update interval for the at least one database server.

13. The method of claim 9, wherein said updating includes sending a metadata update check from the server to said at least one database server.

14. The method of claim 9, wherein said updating includes saving updated metadata in the metadata database and recording a time of update of the metadata.

15. The method of claim 9, further comprising, before said step of issuing a retrieval request from the user to said at least one database server, verifying that the user is satisfied with the search result transmitted from the server to the user.

16. The method of claim 9, further comprising translating the retrieval request from the user to said at least one database server into a format compatible with a distributed database associated with said at least one database server.

17. The method of claim 9, wherein said step of transmitting a search result from the server to the user includes sending a URL of a database server to the user.

18. The method of claim 9, wherein said step of transmitting a search result from the server to the user includes sending a retrieval condition statement to the user.

19. The method of claim 9, wherein said step of issuing an inquiry from the user to a server containing the metadata database at least includes designating a keyword.

* * * * *